United States Patent [19]
Dye

[11] 3,986,582
[45] Oct. 19, 1976

[54] BRAKING SYSTEM FOR A ROLLABLE SERVICE CART

[75] Inventor: William G. Dye, Jacksonville, Fla.

[73] Assignee: Universal Oil Products Company, Des Plaines, Ill.

[22] Filed: June 9, 1975

[21] Appl. No.: 587,473

[52] U.S. Cl.................................. 188/31; 188/69
[51] Int. Cl.² ........................................ B60T 1/02
[58] Field of Search............ 188/1 D, 9, 10, 19–21, 188/31, 69

[56] References Cited
UNITED STATES PATENTS

| | | |
|---|---|---|
| 1,196,724 | 8/1916 | Sherman et al.................... 188/31 X |
| 1,268,772 | 6/1918 | Schmidt.............................. 188/31 |
| 2,050,251 | 8/1936 | Alexander......................... 188/31 X |
| 3,690,415 | 9/1972 | Nordskog............................ 188/69 |
| 3,701,396 | 10/1972 | House................................. 188/21 |

*Primary Examiner*—Duane A. Reger
*Attorney, Agent, or Firm*—James R. Hoatson, Jr.; Philip T. Liggett; William H. Page, II

[57] ABSTRACT

Spring-biased longitudinally movable pin means are mounted to be engageable with circumferentially spaced recesses around the inside faces of non-pivoting casters that are, in turn, positioned under the mid-portion of a rollable service cart so as to provide for an automatic braking system for such cart. Cam means provided to retract the springbiased braking pins from the caster recesses and manually operated linkage means extending from each end of the cart to connect to said cam means provide for a cart operator stationed at either end of the cart to release the braking system and thereby permit movement of the cart.

3 Claims, 6 Drawing Figures

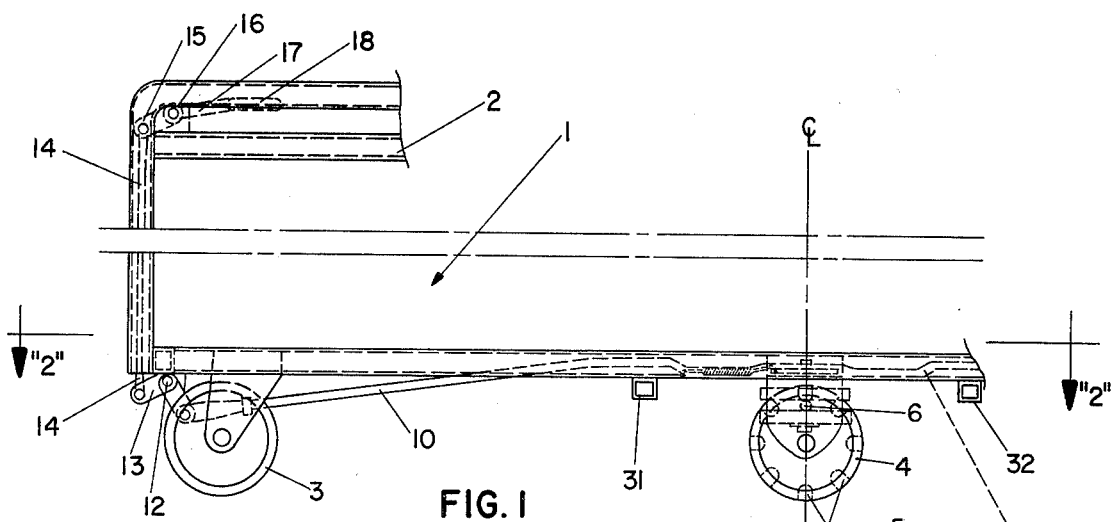
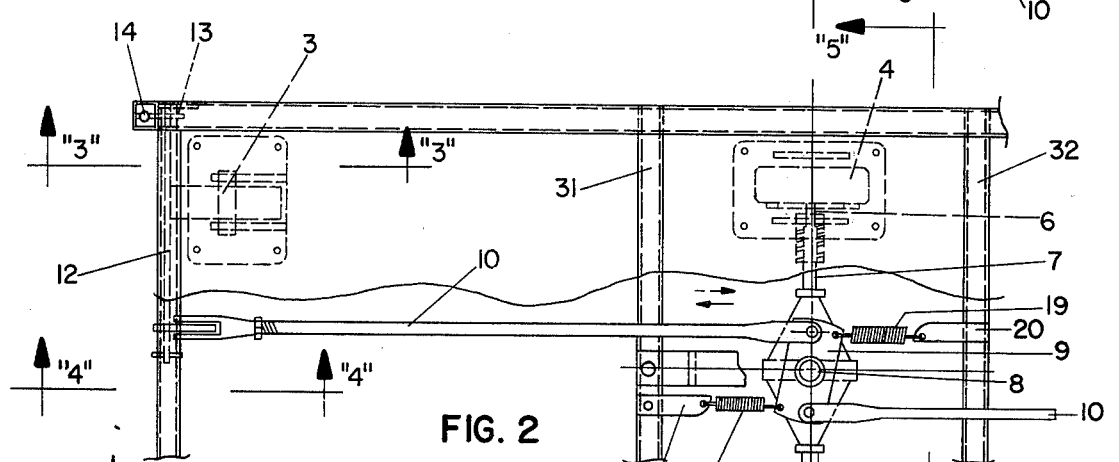
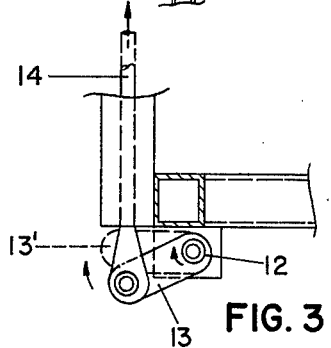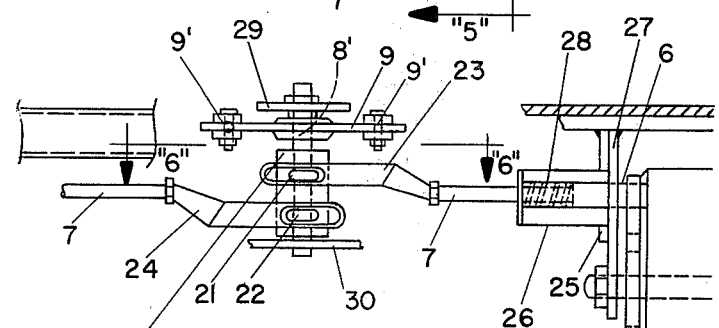
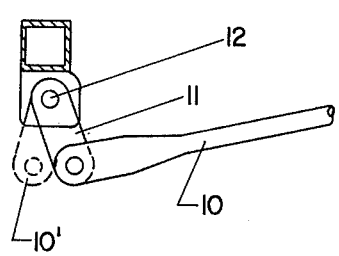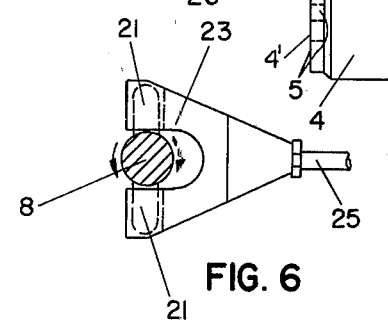

BRAKING SYSTEM FOR A ROLLABLE SERVICE CART

The present invention relates to the use of a retractable shear pin type of wheel braking system for a movable service cart.

More particularly, the present braking system is spring-biased in a manner to provide a "dead-man" type of braking for the cart and the requirement for a cart operator to effect a continuous release of the braking arrangement to, in turn, permit the rolling movement of the cart.

Actually, the braking system may be applied to various types of rollable units, including grocery carts, package or freight handling carts, and the like; however, it is particularly useful for a wheeled serving cart of the type used in passenger airplanes, or in trains, for the service of food and beverages. It is realized that there are many types of braking means or wheel locking systems and that such systems embody hand and/or foot operated wheel lock means on at least one wheel or roller. Also, there are various types of locking pads to engage the floor and preclude a rolling movement for the cart or other form of rollable unit. However, many present forms of braking or brake operating systems require a positive lever movement or some prescribed action on the part of an operator to set the braking system, rather than have an automatic, "deadman" braking action when the cart is brought to a desired location.

It may be considered a principal object of the present invention to provide a simplified form of "dead-man" wheel locking apparatus so that there is no movement of the cart except during the time that an operator is releasing the brake system and actually moving the cart.

It is also an object of the present braking system to utilize an operation where spring-biased, retractably movable shear-pins are used to engage slots or recesses in the sides of wheels or casters that are positioned under the mid-portion of the cart.

In a broad embodiment, the present invention provides an automatic braking system for a rollable service cart having spaced supporting casters as part of its undercarriage, and comprises in combination, (a) providing a pair of spaced braking casters under the midportion of said cart, with one caster to each side of the longitudinal center line of the cart, (b) a plurality of recess means at circumferentially spaced distances around the interior side faces of each of said spaced casters, (c) springbiased movable pin means held adjacent said interior side faces of said spaced casters and in a position to be in alignment with the circumferentially spaced recess means therein to provide automatic braking of such casters and said cart, (d) movable cam means connecting to said movable pin means, and (e) manually movable linkage means from an end portion of said serving cart to said movable cam means to provide a disconnection of said pin means from said recess means, whereby the cart can be permitted to move on its supporting casters.

A preferred construction and arrangement will also provide brake releasing linkage means that will carry to each end of the service cart such that an operator positioned at either end of the cart, or operators at both ends of the cart, can effect the releasing of the automatically engaging locking pin means and move the cart to a next adjacent location. The advantage of the automatic braking system is, of course, the rapid fixing of the cart location by the release of the linkage means as well as the elimination of need to operate foot peddles, hand brakes, etc., as a time consuming step. The quick, automatic braking system is, of course, particularly advantageous for use with food and beverage serving carts that may be used in airplanes or other moving passenger vehicles where the cart can readily roll and move unless it is locked in a manner to preclude easy rolling and movement. Again, in connection with food and beverage carts utilized down the aisle of a passenger airplane, there is the customary usage of a cart by two stewardesses or servers, one working from each end of the cart in order to effect the rapid servicing of the passengers in the plane.

The braking system preferably makes use of fixed position, symmetrically located and spaced rollers or casters under the mid-portion of the service cart such that there will be a uniform braking of the cart and means to preclude rolling or twisting about only one wheel that is being braked. There may be a spring biasing of the pin means so as there is the automatic action of the pin to provide for its insertion into one of the plurality of recesses around the inside portion of a caster. Thus, the linkage will operate against the spring biasing of the pin in order to effect a retraction of the pin from the locking and braking position. Various types of cam operations, or linkage means may be provided to effect the retraction of the pin means from the recesses in the casters so that it is not intended to limit the construction to any one type of cam or linkage arrangement. Also, there may be various types of levers, rods, rotating shafts, hand grips, lift bars or push bars, etc., to provide the linkage connection to the cam means and to the spring-biased pin means. It is, however, preferable that the linkage means carry along under the cart along with the undercarriage of the cart as well as upwardly along an end of the cart, or upwardly along both ends of the cart such that an operator may effect the brake releasing operation from an upper portion of the cart in order to in turn permit the easy hand operation of the releasing mechanism and preclude the need for stooping or utilizing foot-operated peddle means.

A particular feature of the present braking system is to have spring biasing for the pin means and/or with the linkage means such that there is a "dead-man" braking operation requiring the operator to constantly hold the brake releasing means to permit cart movement. As heretofore noted, at any time an operator releases the brake release handle, bar, or whatever, there will be the immediate spring-biased setting of the braking pins into the caster recesses and the automatic dead-man braking of the cart movement.

The design and construction of the present invention providing a dead-man braking system for a rollable cart may be better explained and the advantages thereof set forth by reference to the accompanying drawing and the following description thereof.

FIG. 1 of the drawing is a partial elevational view indicating the use of roller means for each end of the cart as well as centrally positioned roller means which will provide for the braking of the cart movement.

FIG. 2 of the drawing is a partial plan view, looking down on the undercarriage portion of the cart, as indicated by the line 2—2 in FIG. 1, except with the bottom sheeting removed in order to show a plan view of the linkage connecting to pin means which, in turn, will engage the center casters.

FIGS. 3 and 4 of the drawing are slightly enlarged partial sectional views, such as indicated by the respective lines 3—3 and 4—4 in FIG. 2, in order to show a linkage movement carrying to an upper end portion of the cart.

FIGS. 5 and 6 of the drawing show slightly enlarged partial sectional views of a cam means to provide for the retraction of a wheel locking pin means, with FIG. 5 being viewed along line 5—5 in FIG. 2 and FIG. 6 being a partial plan view along line 6—6 in FIG. 5.

Referring now particularly to FIGS. 1 and 2 of the drawing, there is indicated a lower portion 1 and an upper portion 2 for a rollable and movable service cart such as may be utilized to carry baggage or to serve food and beverages in passenger service operations. Below the floor of the lower portion of the cart 1 there will be suitable wheels or casters, such as end casters 3, provided adjacent the four corners of the movable cart, as well as a pair of centrally positioned wheels or casters 4, each of which is bolted or otherwise fastened to the underside of the cart flooring.

In accordance with the braking system of the present invention, each of the mid-positioned casters 4 will have a plurality of circumferentially spaced recesses 5 around the inside peripheral face of each wheel in order to accommodate spring-biased retractable pin means 6. As shown in FIG. 2, there is also indicated the use of rod means 7 from the pin means 6 carrying to a central rotatable shaft portion 8 and connecting cam means, which will be better shown and explained in connection with FIGS. 5 and 6 of the drawing, whereby there can be the retraction of the pin means 6 by the operation of plate means 9, which is connective to the shaft 8 and elongated pull bars 10. The latter, in turn, connect through suitable lever arms or pivoted bar means 11 and shaft means 12 to carry the linkage to each end of the cart. Also, it is shown that the shaft 12 can carry movement from a short movable arm or bar means 13 and from the end of a vertical rod 14 which extends to the upper end portion of the cart to connect with an upper movable bar 15. The latter is moved or rocked up and down by the rotation of a horizontal shaft 16 in turn responsive to a movement from arm means 17 and a bar 18.

As best shown in FIG. 2, there are tension springs 19 connective between fixed framing on the undercarriage of the cart at 20 and end portions of the bar means 9 such that the latter is biased to provide a clockwise rotation of this plate around central shaft 8 and the normal biasing or urging of the elongated rods 10 to pull them respectively towards the center of the cart and away from the ends thereof. Thus, in order to move the horizontal plate 9 in a counter-clockwise motion (as shown in FIG. 2) to, in turn, effect a releasing of the locking pins 6 from casters 4, there must be the tension pulling of the respective long rods 10. Pulling of rods 10 is initiated by a cart operator in the present arrangement by pushing downwardly on the lever or bar means 18 (as indicated at the top portion of the cart in FIG. 1) which, in turn, depresses arm 17 to cause rotation of shaft means 16 and a lifting of arm member 15, as well as the upper portion of vertical linkage rod 14, to effect a lifting of the outer end portion of bar 13 at the lower end of the cart.

Reference to FIG. 3 of the drawing indicates, in a slightly enlarged sectional view, that as the rod 14 is lifted there is also the raising of arm 13 to the dashed-line position 13'. Thus, with arm 13 being welded or otherwise fixed to a rotatable shaft member 12, there is a resulting clockwise rotation in the latter as rod 14 is lifted to, in turn, initiate rotational movement to arm member 11 which is connective to the elongated rod 10. The partial, slightly enlarged, sectional view of FIG. 4 shows the shaft 12 connecting with a movable arm member 11 and the latter, in turn, pin connected to the end of rod means 10 such that the latter can be moved to the position indicated at 10'. This movement will provide a counter-clockwise movement for the plate 9 under the center portion of the cart to result in the releasing of the pin means 6 from the recess means 5 in the respective spaced apart casters 4. By virtue of the use of tensioning springs 19 on the plate member 9 and also acting on rods 10, it will be obvious that it is necessary that a cart operator maintain a constant pressure on the upper actuating bar 18 in order to keep the locking pin means 6 in a retracted non-locking position so as to permit cart movement.

Reference to FIG. 5 of the drawing illustrates one embodiment of how the operation of horizontal plate member 9 from the respective pivot connections at 9' to elongated rods 10 can, in turn, effect the retraction of the pin means 6. Specifically, there is indicated the keying of the upper end portion of 8' for shaft 8 into the center of plate 9 so that shaft 8 will rotate in a two-directional manner responsive to the movement of plate 9. In order to effect a back and forth reciprocating motion for the pin means 6, the shaft 8 is provided with extended arm or cam means at 21 and 22 to effect the operation of the respective cam housings 23 and 24. The member 23 is indicated as connecting to a rod means 7 which, in turn, is connective with one of the laterally movable or retractable pin means 6 so as to effect the desired retracting movement of the latter responsive to cam means 21 and the heretofore described linkage means carrying to plate 9.

In the present embodiment, pin means 6 is indicated as extending through the end portion of a cylindrical housing 26, which is attached to a depending roller support means 27 and reinforcing plate 25, and will be of sufficient length to provide for the internal positioning of a compression spring 28 around rod means 7 such that there is a continuous spring-biasing against an interior face or shoulder for the locking pin means 6 to cause the latter to be urged outwardly toward the face of caster means 4. The latter is indicated as having a facing plate 4' to provide for the spaced notches or recesses 5 that, in turn, can accommodate the outer end portion of retractable locking pin means 6. It is to be understood that the design and construction of the caster locking arrangement is symmetrical about the longitudinal center line of the cart such that similar locking pin means 6, spring-biasing 28, etc., will be provided to engage similar recess means 5 along the inside interior face of a second roller or caster 4, whereby there will be a symmetrical and uniform locking and braking of the cart from its mid-section.

Various types of cam arrangements may be provided to effect the back and forth movement for the cam housings 23 and 24 and the respective opposing locking pins 6; however, in accordance with the present illustrated embodiment, as best shown in the partial plan view of FIG. 6, there may be extended cam arm means 21 from rotatable shaft means 8 to press against a portion of the cam housing 23 such that rod 7 can be pulled towards the center of the cart to, in turn, retract pin means 6 from the face of the caster 4. Although not shown, a similar opposing arrangement may be provided in connection with cam housing 24 such that a cam arm at 22 can effect the movement of the cam housing and its connecting rod 7 and locking pin 6 to effect the disengagement of a braking of the opposing caster 4.

It is to be realized that variations may be made in the linkage system and/or the cam means for effecting the retraction of the springbiased locking pin means 6. For example, various types of cam shapes may be utilized in lieu of the bar means at 21 and 22 from the rotating shaft arrangement 8 by having pin connecting lever arm means to an end portion of connecting rod means 7 in lieu of the cam arms and the cam housing arrangement. There may also be provided variations in the manner of spring-biasing the movement of locking pin means 6 into one of the spaced recesses 5 on caster or wheel 4, rather than utilize the compression spring arrangement 28 within cylindrical housing 26 and against internal portion of pin means 6.

In still another modification, there may be different linkage and pivot arm means at the upper end portions of a cart to provide for the lifting of an arm or bar at 18 rather than provide for the downward pressure on bar 18 to effect the lifting of rod 14 and the ultimate pulling of rod means 10 to move the plate 9 which, in turn, moves the cam arrangement from shaft 8. Also, the present embodiment indicates two different springs 19 attaching to plate 9 to effect a spring-biasing of the linkage system into an automatic brake locking arrangement; however, again with the utilization of direct connecting linkage means between the cam means and the locking pin means 6, there may be the elimination of one or the other of the spring means at 19 or 28. It is to be understood that the term "cam means" as used herein may relate to any known form of cam member or linkage arrangement to effect a reciprocating motion from the plate 9 and/or from the shaft 8.

The present embodiment, as shown in FIG. 5, illustrates diagrammatically upper framing supporting means at 29 and a lower transverse framing member 30 to hold the upper and lower extremities of the shaft means 8 and 8'. These framing members 29 and 30 can extend between undercarriage support tubes such as 31 and 32, as shown in FIGS. 1 and 2; however, other types of support framing may well be utilized to extend between the tubing or from a lower cart bottom portion as a part of the undercarriage of the movable cart, and it is not intended to limit the invention to any one type of linkage support means. In still another aspect, there may be various types of holes or recess means in combination with the mid-position caster wheels 4 and various sizes and configurations for the movable locking pins 6, as long as there is provided a suitable positive shear-pin locking arrangement between the movable linkage and the locking of the wheel movement. It is, of course, a desired feature of the present improved system to provide spring-biasing for a positive "deadman" action, in effecting the lateral movement of locking pin means into a side portion of a cart wheel, or into a pair of cart wheels.

I claim as my invention:

1. In combination with a rollable service cart having spaced supporting casters as part of its undercarriage, the improved automatic braking system for the cart, which comprises in combination,
   a. a pair of spaced braking casters positioned under the mid-portion of said cart, with one caster to each side of the longitudinal center line of the cart,
   b. a plurality of pin receiving recess means at circumferentially spaced distances around the interior side faces of each of said spaced casters,
   c. spring-biased movable pin means held adjacent said interior side faces of said spaced casters and in a fixed position to be in alignment with the circumferentially spaced recess means therein to provide automatic braking of such casters and said cart,
   d. centrally positioned and horizontally rotatable movable cam means connecting to said movable pin means, and
   e. manually movable linkage means including rod means extending from an end portion of said serving cart to said movable cam means to provide a disconnection of said pin means from said recess means and spring means maintaining said rod means in tension, whereby the cart can be permitted to move on its supporting casters.

2. The cart braking system of claim 1 further characterized in that the linkage means to said movable pin means carries to the upper portion of each end of the service cart, whereby manual movement may be provided for the linkage means from either end of said cart.

3. The cart braking system of claim 1 further characterized in that a pressure bar is provided at each end of said service cart and along the upper portions thereof connective with said movable linkage means through connecting lever arm means to effect retraction of said movable pin means responsive to downward pressure from an operator at either end of said service cart.

* * * * *